United States Patent
Krüger et al.

(10) Patent No.: US 6,502,458 B1
(45) Date of Patent: Jan. 7, 2003

(54) METHOD FOR CHECKING THE OPERATIONAL READINESS OF A VALVE

(75) Inventors: Stephan Krüger, Obertshausen (DE); Paul Kradepohl, Gelnhausen (DE); Norbert Steigleder, Mainz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/079,095

(22) Filed: May 14, 1998

Related U.S. Application Data

(63) Continuation of application No. PCT/DE96/02177, filed on Nov. 13, 1996.

(30) Foreign Application Priority Data

Nov. 14, 1995 (DE) .......................................... 195 42 291

(51) Int. Cl.$^7$ .......................... F16K 37/00; G01L 27/00; G09B 23/02
(52) U.S. Cl. .................... 73/168; 73/865.9; 702/179; 702/114
(58) Field of Search ..................... 73/1.72, 168, 865.9; 702/114, 33, 105, 179, 34, 35

(56) References Cited

U.S. PATENT DOCUMENTS

| | | | |
|---|---|---|---|
| 4,259,869 A | * 4/1981 | Corlin ................. 73/862.24 X |
| 4,566,310 A | * 1/1986 | Cohen et al. ............. 73/168 X |
| 4,949,288 A | 8/1990 | Bookout ................... 73/168 X |
| 4,980,825 A | * 12/1990 | Tootell et al. ................ 702/83 |
| 5,018,386 A | * 5/1991 | Zeoli ........................... 73/168 |
| 5,033,012 A | * 7/1991 | Wohld .................. 73/865.9 X |
| 5,107,441 A | * 4/1992 | Decker ..................... 73/168 X |
| 5,220,843 A | * 6/1993 | Rak ........................ 73/1.15 X |
| 5,410,495 A | * 4/1995 | Ramamurthi ............... 702/100 |
| 5,433,245 A | * 7/1995 | Prather et al. ............ 73/168 X |
| 5,531,094 A | * 7/1996 | More et al. ............... 73/168 X |
| 5,537,644 A | * 7/1996 | Hamilton et al. ......... 702/33 X |
| 5,748,469 A | * 5/1998 | Pyötsiä ................. 702/185 X |
| 5,992,229 A | * 11/1999 | Pyötsiä et al. ................ 73/168 |

FOREIGN PATENT DOCUMENTS

| | | |
|---|---|---|
| DE | 2843810 C2 | 5/1990 |
| DE | 4032299 A1 | 4/1992 |
| DE | 4218320 A1 | 12/1993 |
| DE | 4242224 A1 | 6/1994 |
| EP | 0629804 A1 | 12/1994 |
| EP | 0708389 A1 | 4/1996 |
| FR | 2524603 | 10/1983 |
| JP | 7-159285 | * 6/1995 |
| JP | 7-294389 | * 11/1995 |
| JP | 8-15102 | * 1/1996 |
| WO | WO 93/05378 | 3/1993 |
| WO | WO 95/08071 | 3/1995 |

OTHER PUBLICATIONS

"Prozessleittechnik", Polke et al., R. Oldenbourg Verlag München Wien 1994, pp. 245–246 and 621–622.

* cited by examiner

*Primary Examiner*—Thomas P. Noland
(74) *Attorney, Agent, or Firm*—Laurence A. Greenberg; Werner H. Stemer; Gregory L. Mayback

(57) ABSTRACT

A method for checking the operational readiness of a valve determines at least one measured value for a valve-specific parameter and compares it with a previously fixed value. The measured value is determined in a cold and unpressurized state of the valve and is compared with a value that is determined analytically from a function model of the valve, for the valve-specific parameter. An upper and a lower limiting value which are fixed for this analytically determined value are assigned to states of the valve that are still tolerable (design reserve). It is indicated that the valve is operationally ready when the measured value is between the upper and the lower limiting value.

9 Claims, 1 Drawing Sheet

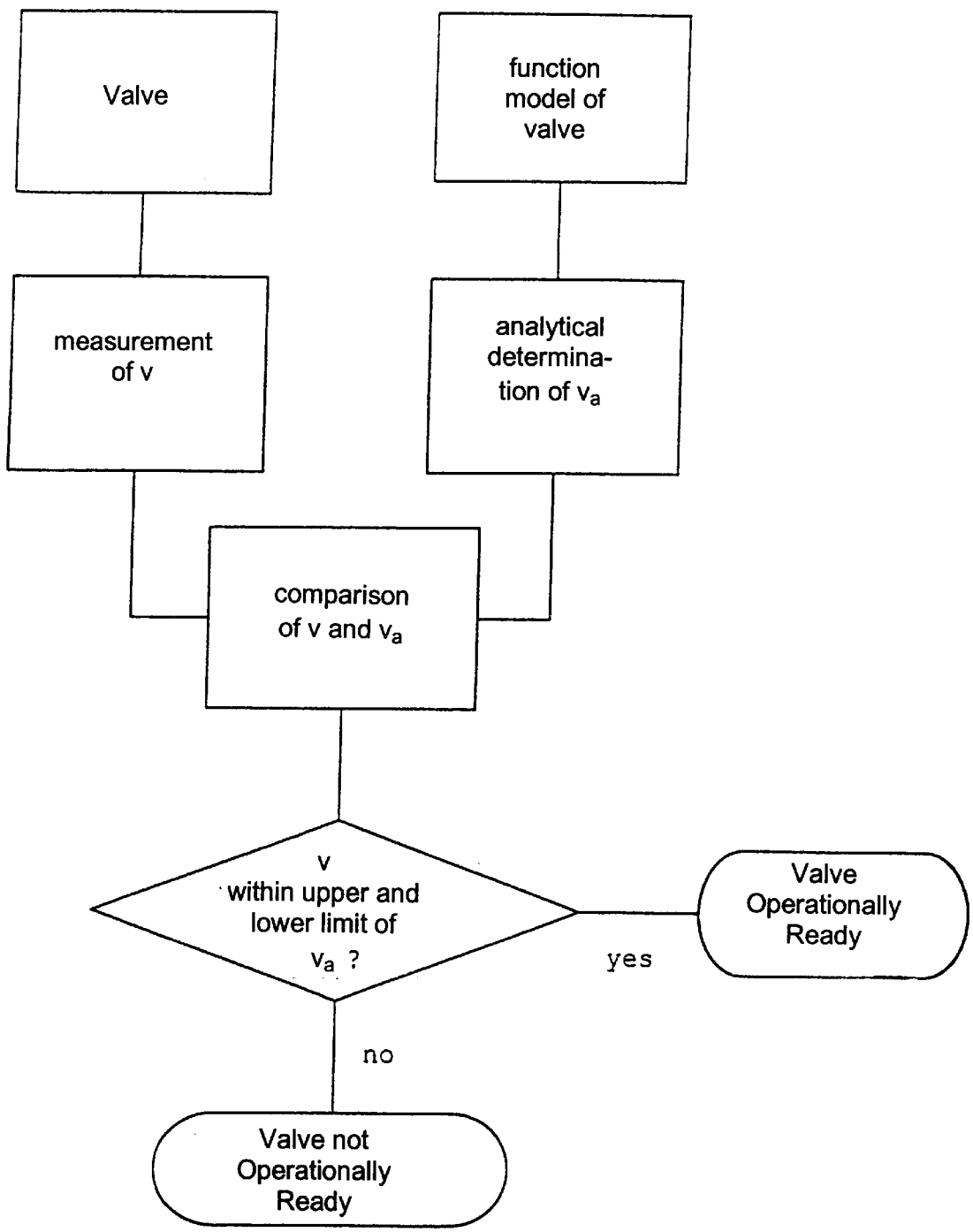

METHOD FOR CHECKING THE OPERATIONAL READINESS OF A VALVE

CROSS-REFERENCE TO RELATED APPLICATION

This application is a continuation of International Application No. PCT/DE96/02177, filed Nov. 13, 1996, which designated the United States.

BACKGROUND OF THE INVENTION

Field of the Invention:

The invention relates to a method for checking the operational readiness of a valve, in which at least one measured value is determined for a valve-specific parameter and is compared with a previously fixed value.

It has previously been conventional for the purpose of checking the operational readiness of a valve to measure certain-valve-specific parameters at intervals, for example the torque, the friction of a stuffing box or of a spindle nut or the no-load power under conditions close to requirements. In that case, conditions close to requirements are conditions such as high temperature and high pressure, which the valve must still withstand, but which are only seldom reached during operation of the valve. A fault in the valve would be displayed or surmised when such measured values varied over the course of time.

Carrying out measurements under conditions close to requirements, for example at very high temperatures, is very expensive or even entirely impossible. Moreover, conditions close to requirements can only be simulated with great difficulty in an installation in which the valve is a component since it is necessary, for example, to increase pressure and temperature. It is therefore difficult to interpret results obtained under such conditions. In order to ensure that a fault in the valve is not overlooked, it has previously been customary to display a fault even in the case of slight variations in the measured values. Since repair or even exchange of a faulty valve is very expensive and is possible, as a rule, only when the entire installation, which can be a nuclear power plant, is at a standstill, it is uneconomical for a fault to be reported prematurely or wrongly.

SUMMARY OF THE INVENTION

It is accordingly an object of the invention to provide a method for checking the operational readiness of a valve, which overcomes the hereinafore-mentioned disadvantages of the heretofore-known methods of this general type and which provides for a fault report only if the operational readiness of the valve is truly at risk. Moreover, it should be possible to demonstrate the operational readiness of the valve through the use of a measurement which is easy to carry out under ambient pressure and ambient temperature. In addition, such a measurement should be able to be performed in a power plant, for example, during a customary inspection period.

With the foregoing and other objects in view there is provided, in accordance with the invention, a method for checking the operational readiness of a valve, which comprises determining at least one measured value for a valve-specific parameter in a cold and unpressurized state of a valve; comparing the at least one measured value with a previously fixed value determined analytically from a function model of the valve, for the valve specific parameter; fixing upper and lower limiting values assigned to still tolerable states of the valve (design reserve) for the analytically determined value; and indicating that the valve is operationally ready when the at least one measured value is between the upper and lower limiting values.

Such a method is referred to as a valve diagnosis and evaluation method.

As a rule, the measurement is carried out from the power supply of the actuator of the valve (for example a switchgear). Calibration measurements on site are also possible if required in order to increase the accuracy.

The method according to the invention achieves the advantage of depressing a fault report when the operational readiness of the valve is not at risk, by virtue of the fact that the limiting values are fixed for each valve-specific parameter on the basis of the design reserve of the valve. Including the limiting values in the check also achieves the advantage of preventing slight variations in a valve-specific parameter from leading to a premature fault report.

Moreover, an advantage which is achieved is that it is possible for the behavior of the valve to be predicted on the basis of a measurement which can be carried out very easily at ambient pressure and ambient temperature under requirement conditions, that is to say in the case of the envisaged used of the valve when a high temperature and a high pressure prevail.

In accordance with another mode of the invention, an upper and a lower desired value are also fixed for the analytically determined value which cover a natural fluctuation of the analytically determined value. The fact that the valve is behaving in accordance with design is then displayed if the measured value is between the upper and the lower desired value.

The desired value deviates from the analytically determined value less than the limiting value. While the desired value only takes account of natural fluctuations, the limiting value covers the fluctuations which are still tolerable for the operational readiness. Specifically, a valve is always constructed in such a way that a valve-specific parameter can deviate from the required value more than is prescribed by the natural fluctuation, without the operation of the valve being impaired. The design of the valve required for this purpose includes the so-called design reserve.

The additional orientation relative to the desired values which are determined by the natural fluctuation of the analytically determined value achieves the additional advantage of detecting at an early stage when the valve is not behaving in accordance with design, but is still operationally ready. It is then possible to institute effective maintenance work in a manner orientated to the state. It is not required to exchange the valve or armature, since it is still operationally ready.

An upper and a lower tolerance value, which are to be prescribed to the measuring accuracy, are determined for the measured value, for example. The operational readiness or the behavior of the valve in accordance with design can then already be denied when the lower tolerance value is less than the lower limiting value or desired value, or the upper tolerance value is higher than the upper limiting value or desired value.

In accordance with a further mode of the invention, the valve includes, for example, an actuator, a power supply and switching elements. The valve can be actuated electrically, magnetically, pneumatically, hydraulically or by a dedicated medium. The measured values are determined by suitable measuring sensors and measuring methods, depending on the type of the valve. Valve-specific parameters can be, for example, the no-load power, the running torque, the spindle force, the valve travel, the operating current, the discharge pressure and/or the running time.

In accordance with an added mode of the invention, the function model describes the behavior of the valve through the travel or stroke or both through the travel or stroke and in "OPEN" and "CLOSED" end positions.

The function model that is set up for the analytical determination of a value is verified experimentally. Its applicability for the respective valve design is ensured through the use of strength calculations using rules of mechanics and design evaluations based on experimental results.

In accordance with an additional mode of the invention, a plurality of measured values are determined, and a fault of the valve is displayed when the measured values are subject to a trend. Following a trend in this way achieves the advantage of making it possible to detect a worsening in the state of the valve as early as when the measured values are still within the two limiting values or desired values.

In accordance with a concomitant mode of the invention, the deviation of a measured value from the limiting value or desired value is determined in each case for a plurality of valves, and a fault is already displayed for a valve when the measured value deviates from the limiting value or desired value more than in the case of the majority of the valves. Such a statistical evaluation advantageously leads to the fact that when the measured values are still within the two limiting values or desired values the less reliable valves can be detected although they are not yet in need of repair at that point in time.

It is possible to increase the accuracy of statements relating to the following of trends and statistical evaluation by online measurements with central acquisition of evaluation, as conditioned by the measurement frequency achievable thereby.

On one hand, in order to provide maintenance which is orientated relative to the state, in particular, the method according to the invention achieves the advantage of detecting only those valves as being faulty whose repair is truly required. On the other hand, due to the consideration of the desired values, the determination of the trends and the statistical consideration, valves are detected which are not yet in need of repair but are to be particularly borne in mind during later instances of checking. Moreover, an advantage which is achieved is that the required measurements can be carried out during normal inspection periods at ambient pressure and ambient temperature.

Other features which are considered as characteristic for the invention are set forth in the appended claims.

Although the invention is described herein as embodied in a method for checking the operational readiness of a valve, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the above description of specific embodiments.

BRIEF DESCRIPTION OF THE DRAWING

The FIGURE is a partial block diagram and partial flow diagram of a method for checking the operational readiness of a valve according to the invention.

DESCRIPTION OF THE PREFERRED EMBODIMENT

Referring now to the single FIGURE of the drawing, it is seen that a method for checking the operational readiness of a valve. The method includes determining at least one measured value v for a valve-specific parameter in a cold and unpressurized state of a valve. The next step is comparing the at least one measured value v with a previously fixed valve-specific-parameter value $v_a$ determined analytically from a function model of the valve. The next step is fixing upper and lower limiting values assigned to still-tolerable states of the valve for the analytically determined value $v_a$. The next step is indicating that the valve is operationally ready when the at least one measured value v is between the upper and lower limiting values.

We claim:

1. A method for checking the operational readiness of a valve, which comprises:

determining at least one measured value for a valve-specific parameter in a cold and unpressurized state of a valve;

comparing the at least one measured value with a previously fixed valve-specific-parameter value determined analytically from a function model of the valve;

fixing upper and lower limiting values assigned to still-tolerable states of the valve for the analytically determined value; and indicating that the valve is operationally ready when the at least one measured value is between the upper and lower limiting values.

2. The method according to claim 1, which comprises fixing an upper and a lower desired value for the analytically determined value covering a natural fluctuation of the analytically determined value; and indicating that the valve is behaving in accordance with design if the measured value is between the upper and the lower desired values.

3. The method according to claim 2, which comprises determining a deviation of a measured value from the desired value for a plurality of valves; and indicating a fault for a valve when the measured value deviates from the desired value by more than in the case of a majority of the valves.

4. The method according to claim 1, which comprises checking the operational readiness of a valve including an actuator, a power supply and switching elements.

5. The method according to claim 1, which comprises describing a behavior of the valve through a stroke, with the function model.

6. The method according to claim 1, which comprises describing a behavior of the valve in "OPEN" and "CLOSED" end positions, with the function model.

7. The method according to claim 1, which comprises describing a behavior of the valve through a stroke and in "OPEN" and "CLOSED" end positions, with the function model.

8. The method according to claim 1, which comprises determining a plurality of measured values and indicating a fault in the valve when the measured values are subject to a trend.

9. The method according to claim 1, which comprises determining a deviation of a measured value from the limiting value for a plurality of valves; and indicating a fault for a valve when the measured value deviates from the limiting value by more than in the case of a majority of the valves.

* * * * *